J. MARSEL.
LOCK FOR AUTOMOBILE STEERING MECHANISM.
APPLICATION FILED JUNE 2, 1921.
1,401,173.
Patented Dec. 27, 1921.
2 SHEETS—SHEET 1.
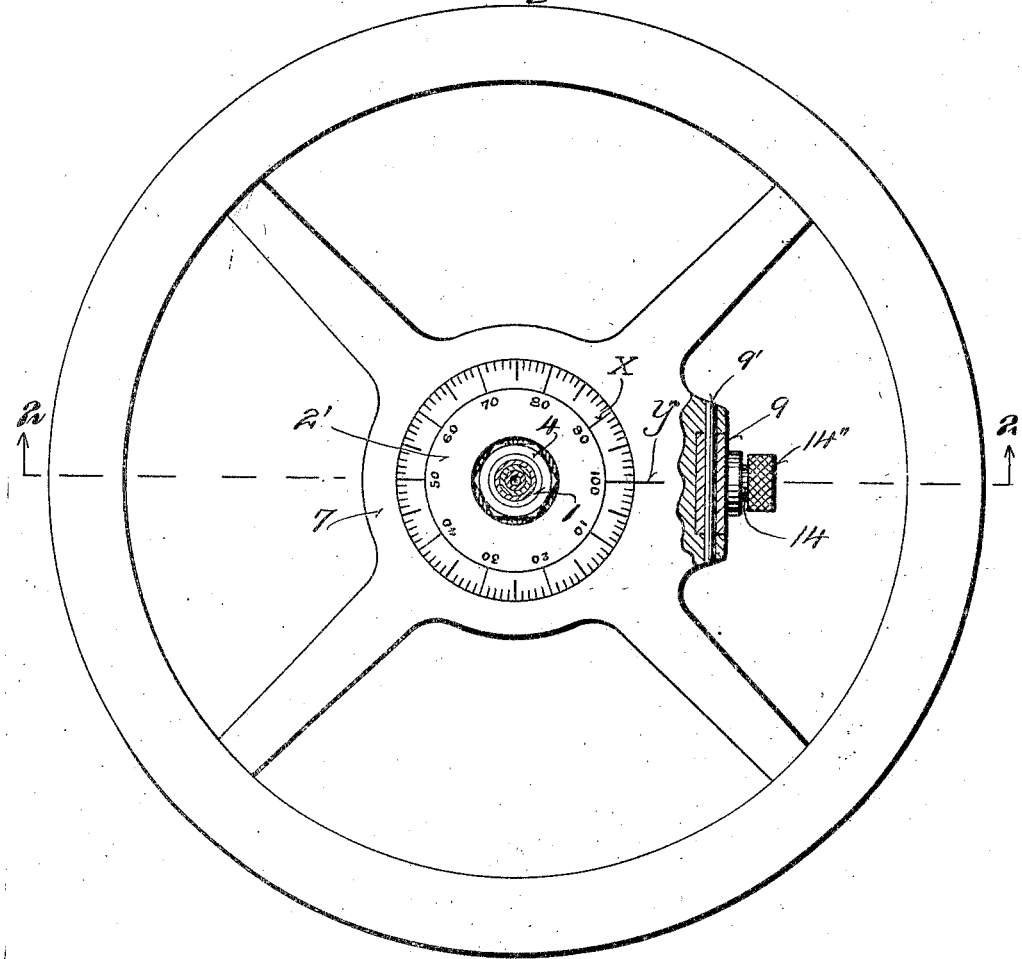
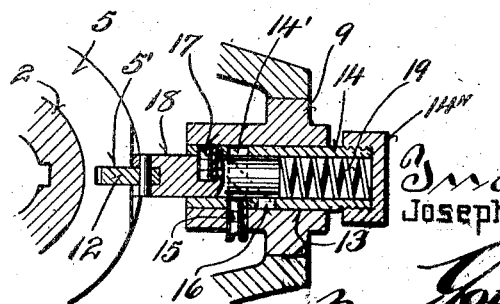
Inventor
Joseph Marsel

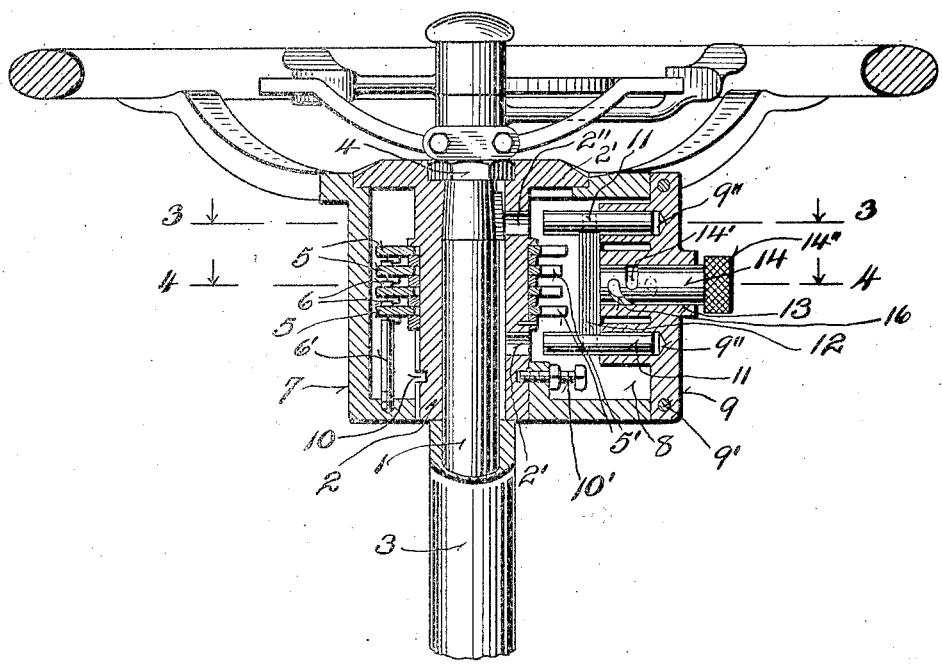

UNITED STATES PATENT OFFICE.

JOSEPH MARSEL, OF MILWAUKEE, WISCONSIN.

LOCK FOR AUTOMOBILE STEERING MECHANISM.

1,401,173.  Specification of Letters Patent.  Patented Dec. 27, 1921.

Application filed June 2, 1921. Serial No. 474,331.

*To all whom it may concern:*

Be it known that I, JOSEPH MARSEL, a citizen of the United States, and resident of Milwaukee, in the county of Milwaukee and State of Wisconsin, have invented certain new and useful Improvements in Locks for Automobile Steering Mechanism; and I do hereby declare that the following is a full, clear, and exact description thereof.

My invention has for its object to provide a simple, economical and effective lock for the steering gear of a motor driven vehicle.

The specific object of my invention is to provide the wheel shaft with a head carrying a series of locking disks of the permutation type, and an open ended hollow hub for the wheel, loosely mounted upon the head carrying means for picking up the tumblers together with a locking plunger, whereby the wheel can be disconnected from the head and locked thereto after a series of rotary operations to adjust the tumblers set upon a predetermined combination, similar in operation to a standard combination lock.

With the above and other minor objects in view, the invention consists in certain peculiarities of construction and combination of parts, as are hereinafter set forth with reference to the accompanying drawings and subsequently claimed.

In the drawings:

Figure 1 represents a plan view of a locking mechanism embodying the features of my invention, with parts broken away and in section to show structural features.

Fig. 2 is a longitudinal sectional view of the same, the section being indicated by line 2—2 of Fig. 1.

Fig. 3 is a plan sectional view, the section being indicated by line 3—3 of Fig. 2.

Fig. 4 is another plan sectional view, the plane of the same being indicated by line 4—4 of Fig. 2, and Fig. 5 is an enlarged detail sectional plan view of the locking plunger actuating mechanism.

Referring by characters to the drawings, 1 represents the wheel or actuating shaft of a standard steering gear mechanism, which shaft has rigidly secured thereto a head 2 provided with an upper flange dial 2'. The head is secured against lateral movement upon the shaft by its engagement with the upper end of the shaft housing 3 and the dial is countersunk for the reception of a nut 4, which is in threaded union with the shaft and thereby binds the head firmly, it being understood that the nut is countersunk so as to eliminate the possibility of convenient access thereto, whereby the parts might, under certain conditions, be tampered with.

The head has loosely mounted thereon a series of disks 5, which are provided with the usual notches 5' that are adapted to be alined, when the mechanism is set for a locking operation. The disks are also provided with standard pick-up lugs 6, which operate successively to aline the disks in the usual manner pertaining to such combination locks.

Rotatably mounted upon the head 2, is a hollow wheel hub 7, which wheel hub is open at its top end and adapted to be closed by the flange dial 2'. The hub is also provided with a lateral plunger receiving mouth 8, which mouth is closed by a cap 9, the same being secured to the walls of the hub by means of concealed rivets 9', whereby the possibility of removing the cap is eliminated. The wheel hub also carries a pick-up finger 6', which is arranged to engage the lug 6 of the lowermost disk series, whereby the said disks are rotated back and forth when the hub is revolved to thus set the combination, it being understood, as best shown in Fig. 1, that the flange dial is provided with series of indices X which are operated from a zero mark *y* impressed within the face of the wheel hub. In order to prevent dropping of the wheel hub from its engaged position with the flange dial, I provide an annular groove 10 in the lower portion of the head 2 for the reception of a threaded pin 10', which is carried by a lug that extends from the bottom wall of the hub and which pin is adapted to enter the annular groove. Hence, independent movement of the head with relation to the hub is obtained, while these parts are held in their proper endwise relation.

The head 2 is also provided with alined locking apertures 2", which apertures are adapted to receive companion locking plungers 11 that are connected by a tongue 12. The locking plungers are reciprocatively mounted in recesses 9" formed in the cap 9, The cap is also provided with a central circular opening 13 for the reception of a rotary sleeve 14. The sleeve is provided with a semi-circular slot 14' into which slot is fitted a pin 15 that extends through the cap, whereby said sleeve is permitted to rotate approximately a half revolution, but is held against lateral movement in the opening. The sleeve is also provided with a semi-circular spiral slot 16. The spiral slot 16 constitutes a cam that is engaged by a pin 17 that extends from a plug 18, which plug is secured to and forms part of the tongue 12, the same being extended rearwardly into the thimble 14.

As shown in Fig. 5, there is interposed between the end of the plug and a knurled head 14" of the thimble a coil spring 19, the same serving to spread the telescopic parts and to take up play therein. The spring also serves to force the locking plungers 11 into engagement with the locking apertures 2" of the head when the cam slot is rotated in one direction by manipulating the knurled head 14".

From the foregoing description, it will be seen that when it is desired to prevent operating the motor driven machine, the steering wheel is disconnected from the shaft, 1 in such way that it will revolve loosely upon its bearings. In this loose position, the plungers 11 will be retracted, due to a partial rotation of the sleeve, whereby the cam slot 16 will draw the plungers clear of their locking apertures, and hold them in such position as indicated in Fig. 2 of the drawings. When it is desired to lock the steering mechanism so that it will function, the operator knowing the combination of the permutation lock, will rotate the wheel back and forth, so as to successively pick up the disks and properly aline their notches 5' with the tongue 12 of the associated plungers 11. When the parts are in this position, the tongue 12 is alined so that it will enter the disk notches and thereby permit the plungers 11 to engage the locking apertures 2". Hence, the operator simply rotates the sleeve 14 by manipulating the knurled head 14', whereby the cam slot and its pin connection with the plug 18 will positively shift the locking plungers into engagement with their associated sockets. The wheel hub being thus locked to the steering gear shaft 1, the parts are obviously in position to function in the ordinary manner.

As shown in Fig. 2 of the drawings, the wheel is illustrated as having attached thereto the ordinary manipulating levers for the spark, etc.

While I have shown and described my invention in all of its details, it is understood that I may vary the structural features within the scope of the claims.

I claim:

1. A steering gear lock comprising an actuating shaft, a head secured thereto having a locking aperture therein, a dial flange extending from its upper end, notched tumbler disks rotatably mounted upon the head, an open ended hollow wheel hub loosely mounted upon the head, the open end of the hub being closed by the dial disk, a pick-up finger carried by the hub for actuating the series of disks, a plunger carried by the hub for engagement with the locking aperture of the head, a tongue extending from the plunger adapted to enter the disk notches, a plug extending rearwardly from the tongue having a lateral pin extension, and a rotary sleeve mounted in the hub having a cam slot for engagement with the plug pin.

2. A steering gear lock comprising an actuating shaft, a head secured thereto having locking apertures therein, a dial flange extending from its upper end, notched tumbler disks rotatably mounted upon the head, an open ended hollow wheel hub loosely mounted upon the head, the open end of the hub being closed by the dial disk, a pick-up finger carried by the hub for actuating the series of disks, a pair of locking plungers reciprocatively mounted in the hub and adapted to engage the locking apertures, a rotary actuating sleeve journaled in the hub, the sleeve having a cam slot therein, means for holding the sleeve against endwise movement, a tongue connecting the plungers, a lug extending from the tongue in telescopic union with the sleeve and a pin projecting from the lug for engagement with the sleeve cam slot.

In testimony that I claim the foregoing I have hereunto set my hand at Milwaukee, in the county of Milwaukee and State of Wisconsin.

JOSEPH MARSEL.